A. D. JOHNSON.
NUT LOCK.
APPLICATION FILED MAR. 29, 1911.
1,022,318.
Patented Apr. 2, 1912.
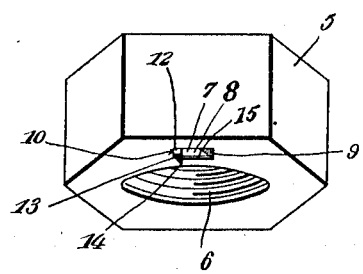
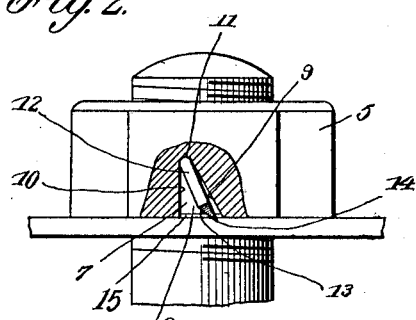
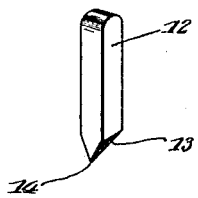
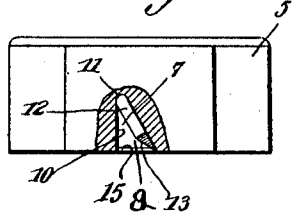
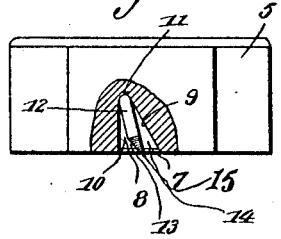
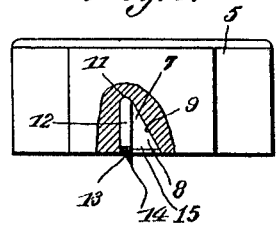
Inventor
Arthur D. Johnson,
Witnesses
By Victor J. Evans
Attorney

UNITED STATES PATENT OFFICE.

ARTHUR D. JOHNSON, OF PHILADELPHIA, PENNSYLVANIA.

NUT-LOCK.

1,022,318.  Specification of Letters Patent.  Patented Apr. 2, 1912.

Application filed March 29, 1911. Serial No. 617,546.

*To all whom it may concern:*

Be it known that I, ARTHUR D. JOHNSON, a subject of the King of Great Britain, residing at Tacony, Philadelphia, in the county of Philadelphia and State of Pennsylvania, have invented new and useful Improvements in Nut-Locks, of which the following is a specification.

The invention relates to improvements in nut locks, and has for its primary object to provide a nut in which a locking dog or pawl is held and capable of free movement, so that upon the turning home of the nut on a bolt, the said dog or pawl will engage the surface of the part clamped by the said nut, and thereby lock the latter against working loose on the bolt.

Another object of the invention is the provision of a nut lock in which the locking dog or pawl is so mounted within the body of the nut that the same will not fall out when the nut is freed from a bolt, and that will securely hold the nut fast when worked home on the bolt for clamping parts together.

A further object of the invention is the provision of a nut lock which is simple of construction, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is perspective view of a nut constructed in accordance with the invention. Fig. 2 is a side elevation thereof, the same being shown partly broken away. Fig. 3 is a perspective view of the locking dog or pawl removed from the nut. Figs. 4, 5 and 6 are fragmentary sectional views through the body of the nut on an enlarged scale, showing the different positions the dog or pawl is adapted to assume.

Similar reference characters indicate corresponding parts throughout the several views of the drawings.

Referring to the drawings by numerals, 5 designates the body of a conventional form of nut, having the usual threaded bore 6 for the passage of the bolt on which the nut is to be screwed. The base or bearing surface of the nut body 5 is provided with a socket or recess 7 extending a suitable distance into the said body of the nut and arranged diagonally across said base of the nut, adjacent to one corner thereof, so that the biting end of the locking dog will have an orbit of movement concentric with the bore 6, in the operation of screwing the nut on or off of the bolt. The recess 7 is of oblong rectangular shape at its outer end, and thence tapers inwardly, so that the said recess, as a whole, is of substantially V-form, the side walls 8 of the recess being straight, while one end wall 9 thereof is disposed at an incline, and its opposite end wall 10 straight with respect thereto. The end wall 9 of the recess inclines uniformly inward on a straight line to the extreme inner end of the recess, where is merges into an arcuately curved seat 11.

The locking dog 12 comprises a comparatively long pin of a length slightly exceeding the length of the recess 7, and having its side faces plain or smooth surfaced to slide easily in contact with the walls of the recess. The inner end of the dog 12 is curved correspondingly to the seat 11, while its outer end is provided with a beveled face 13 forming a sharpened tooth 14, the pin 12 being held within the recess 7 by means of the instruck burred outer edges 15 of the recess 7, thereby preventing the possibility of the pin falling from the body of the nut when disengaged from the bolt.

Normally the pin 12 contacts with the inclined wall of the recess 7 in the body of the nut, and it will be seen, from the foregoing description, that the dog is loosely mounted in this recess 7, and it is in operation adjustable automatically by contact with the surface of the part engaged or clamped by the bearing surface of the nut, thereby preventing the loosening of the nut on the bolt when engaged therewith. The locking pin or dog 12, when shifted within the recess 7, will positively bite into the surface of the part clamped by the bolt and nut.

What is claimed is:

A nut lock comprising a body having in its bearing face a recess extending within the body, a locking dog of slightly greater length than the depth of the recess, said dog having one of its ends rounded to snugly engage the seat within the recess and formed on its opposite end with a biting tooth, and instruck burs formed on the outer edge of the side walls of the recess in the body of the nut and projecting toward each other to engage the opposite sides of the dog to hold the same within the recess.

In testimony whereof I affix my signature in presence of two witnesses.

ARTHUR D. JOHNSON.

Witnesses:
RAYMOND D. LE GRAND,
LAFAYETTE LE GRAND.

Copies of this patent may be obtained for five cents each, by addressing the "Commissioner of Patents, Washington, D. C."